No. 619,944. Patented Feb. 21, 1899.
J. ELLIS.
WATER FILTER.
(Application filed Dec. 8, 1898.)

(No Model.)

WITNESSES:

INVENTOR:
John Ellis
Per Edwin W. Brown
ATT'Y

UNITED STATES PATENT OFFICE.

JOHN ELLIS, OF LYNN, MASSACHUSETTS.

WATER-FILTER.

SPECIFICATION forming part of Letters Patent No. 619,944, dated February 21, 1899.

Application filed December 8, 1898. Serial No. 698,689. (No model.)

*To all whom it may concern:*

Be it known that I, JOHN ELLIS, of Lynn, in the county of Essex and State of Massachusetts, have invented certain new and useful Improvements in Water-Filters, of which the following is a full, clear, and exact description.

This invention consists of a water-filter constructed and arranged for operation, all substantially as hereinafter fully described, reference being had to the accompanying sheet of drawings, in which is illustrated a water-filter constructed in accordance with this invention.

Figure 1:
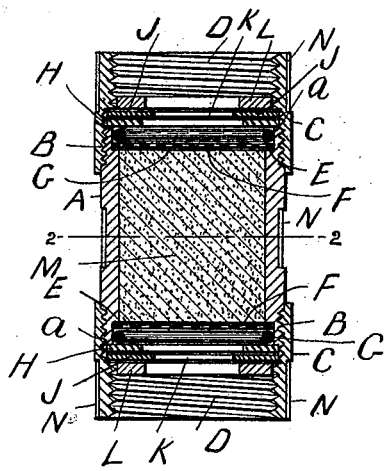
Figure 2:
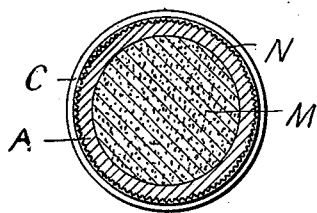

Figure 1 represents the filter in central vertical section, and Fig. 2 is a cross-section on line 2 2, Fig. 1.

In the drawings, A represents the body of the filter, composed of a casing or shell of tubular shape, having on each end an external screw-thread B, over which is arranged to screw a short tube or sleeve C, one on each end, having in its outer end an internal screw-thread D, by which the filter can be screwed onto the water-faucet in the usual manner.

Both ends of the filter are constructed alike, each end being a duplicate of the other, so the filter can be changed from end to end, as usual in filters.

Near each end of the casing is an internal shoulder E, on which rests a perforated plate or disk F, which is held in place by a wire spring open ring G.

On the end $a$ of the casing over the spring-ring G is a flexible washer H, preferably of leather, and against this leather washer is a plate or diaphragm J, of metal, having a central round hole or opening K through it, and over this diaphragm is a flexible washer L, preferably of india-rubber, closely fitting the inside of the sleeve which holds the diaphragm in place and also serves to prevent leaking of the filter at the joint with the faucet when screwed thereon.

In the central portion of the casing between the two perforated plates F is the filtering material M, such as charcoal, sand, or any suitable material.

The outer surface of the casing and the two outer ends of the sleeves are roughened, as at N, to give a hold on the filter when attaching it to and detaching it from the faucet.

A filter constructed as described having a diaphragm J, which serves to steady and give a roundness to the stream of water as it passes through it, made separate from and independent of the casing or body, enables the filter to be made by striking up all the parts, whereby the filter can be made very cheap; also, as all the parts of the filter can be separated from each other the filter can be easily taken apart and cleaned—an advantage over many other filters. It can be made of any suitable metal and the washers of any suitable material, and the outside can be nickel-plated or ornamented, as desired.

Having thus described my invention, what I claim is—

A water-filter composed of a casing or shell in which is the filtering material, a shoulder inside near its end, a tube or sleeve adapted to be screwed on its end, having an internal screw-thread by which to secure it to the water-faucet, a perforated plate resting on the casing-shoulder, a spring-ring next thereto, then a flexible ring washer, a flat ring or diaphragm with a central hole and a flexible ring washer over the same.

In testimony whereof I have hereunto set my hand in the presence of two subscribing witnesses.

JOHN ELLIS.

Witnesses:
 EDWIN W. BROWN,
 F. B. WENTWORTH.